US012522083B1

(12) United States Patent
Wang et al.

(10) Patent No.: US 12,522,083 B1
(45) Date of Patent: Jan. 13, 2026

(54) EMULATING HANDLING CHARACTERISTICS WITH AN ELECTRIC VEHICLE

(71) Applicant: GM Global Technology Operations LLC, Detroit, MI (US)

(72) Inventors: Orson S. Wang, Northville, MI (US); Jayant Chalke, Troy, MI (US); Daniel Owen, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 32 days.

(21) Appl. No.: 18/816,467

(22) Filed: Aug. 27, 2024

(51) Int. Cl.
*B60L 15/20* (2006.01)
*B60L 3/10* (2006.01)

(52) U.S. Cl.
CPC .......... *B60L 15/2036* (2013.01); *B60L 3/106* (2013.01); *B60L 2240/14* (2013.01); *B60L 2240/22* (2013.01); *B60L 2240/24* (2013.01); *B60L 2240/423* (2013.01); *B60L 2250/26* (2013.01)

(58) Field of Classification Search
CPC .............................. B60L 3/106; B60L 15/2036
See application file for complete search history.

(56) References Cited

U.S. PATENT DOCUMENTS

| | | | |
|---|---|---|---|
| 2015/0202963 A1* | 7/2015 | Li | B60L 50/51 |
| | | | 701/33.1 |
| 2023/0057597 A1* | 2/2023 | Oguro | B60L 15/2036 |
| 2023/0063054 A1 | 3/2023 | Maddi et al. | |
| 2024/0075936 A1 | 3/2024 | Oh et al. | |
| 2025/0206325 A1* | 6/2025 | Oh | B60L 3/106 |
| 2025/0269736 A1* | 8/2025 | Lee | B60L 15/2036 |

FOREIGN PATENT DOCUMENTS

DE  102021209652 A1  3/2023

* cited by examiner

*Primary Examiner* — Anshul Sood
(74) *Attorney, Agent, or Firm* — Vivacqua Crane, PLLC

(57) ABSTRACT

According to several aspects, a method for controlling an electric vehicle is provided. The method may include adjusting an operation of one or more electric motors of the electric vehicle to induce a loss of traction of a first wheel of the electric vehicle on a first side of the electric vehicle. The method further may include adjusting an operation of an electric steering system of the electric vehicle to induce a yaw motion of the electric vehicle. A direction of the yaw motion is away from the first side of the electric vehicle.

20 Claims, 6 Drawing Sheets

EMULATING HANDLING CHARACTERISTICS WITH AN ELECTRIC VEHICLE

INTRODUCTION

The present disclosure relates to systems and methods for performance enhancement and entertainment for a vehicle.

To increase occupant enjoyment and entertainment, vehicles may be equipped with performance enhancing features which are configured to provide unique experiences to occupants. For example, vehicles may be equipped with "launch control" systems to provide an enhanced experience when rapidly accelerating from a stop or a low speed. In a non-limiting example, launch control may be configured to provide a highest possible acceleration based on vehicle capabilities and road conditions. In another example, vehicles may be equipped with performance-oriented drive modes such as, for example, sport mode, track mode, and/or the like. Performance-oriented drive modes may offer enhanced acceleration, enhanced braking, enhanced handling, enhanced aerodynamics, and/or the like. Advancements in electric propulsion and control systems have resulted in electric vehicles with well-defined, smooth, and predictable handling characteristics. However, automobile enthusiasts may desire to experience handling characteristics which are typical of internal combustion engine vehicles.

Thus, while current performance and entertainment systems and methods achieve their intended purpose, there is a need for a new and improved system and method for controlling an electric vehicle.

SUMMARY

According to several aspects, a method for controlling an electric vehicle is provided. The method may include adjusting an operation of one or more electric motors of the electric vehicle to induce a loss of traction of a first wheel of the electric vehicle on a first side of the electric vehicle. The method further may include adjusting an operation of an electric steering system of the electric vehicle to induce a yaw motion of the electric vehicle. A direction of the yaw motion is away from the first side of the electric vehicle.

In another aspect of the present disclosure, adjusting the operation of the one or more electric motors further may include limiting a first torque applied at the first wheel of the electric vehicle based on a first torque limit. Adjusting the operation of the one or more electric motors further may include limiting a second torque applied at a second wheel of the electric vehicle based on a second torque limit. The second torque limit is less than or equal to the first torque limit for a least a portion of an acceleration time period. The second torque limit increases during the acceleration time period.

In another aspect of the present disclosure, limiting the first torque applied at the first wheel and limiting the second torque applied at the second wheel further may include applying the first torque at the first wheel using a first electric motor of the one or more electric motors based at least in part on the first torque limit. Limiting the first torque applied at the first wheel and limiting the second torque applied at the second wheel further may include applying the second torque at the second wheel using a second electric motor of the one or more electric motors based at least in part on the second torque limit.

In another aspect of the present disclosure, limiting the first torque applied at the first wheel and limiting the second torque applied at the second wheel further may include applying a third torque to a differential gearbox of the electric vehicle using a third electric motor of the one or more electric motors. The differential gearbox is in mechanical communication with the third electric motor, the first wheel, and the second wheel. Limiting the first torque applied at the first wheel and limiting the second torque applied at the second wheel further may include applying a braking torque at the second wheel to limit the second torque based at least in part on the second torque limit and limit the first torque based at least in part on the first torque limit.

In another aspect of the present disclosure, the method further may include increasing a slip threshold of a traction control system of the electric vehicle for the first wheel during the acceleration time period.

In another aspect of the present disclosure, limiting the first torque applied at the first wheel and limiting the second torque applied at the second wheel further may include providing a substantially step-like increase in the first torque limit during the acceleration time period using the one or more electric motors in response to receiving an accelerator input. Limiting the first torque applied at the first wheel and limiting the second torque applied at the second wheel further may include providing a first substantially ramp-like increase in the second torque limit in the second torque during the acceleration time period using the one or more electric motors in response to receiving the accelerator input.

In another aspect of the present disclosure, limiting the first torque applied at the first wheel and limiting the second torque applied at the second wheel further may include providing a second substantially ramp-like increase in the first torque limit during the acceleration time period using the one or more electric motors in response to receiving an accelerator input. Limiting the first torque applied at the first wheel and limiting the second torque applied at the second wheel further may include providing a third substantially ramp-like increase in the second torque limit during the acceleration time period using the one or more electric motors in response to receiving the accelerator input. A start time of the third substantially ramp-like increase occurs after a start time of the second substantially ramp-like increase.

In another aspect of the present disclosure, adjusting the operation of the electric steering system further may include providing a turning torque using the electric steering system in response to receiving an accelerator input. The turning torque turns one or more wheels of the electric vehicle away from the first side of the electric vehicle.

In another aspect of the present disclosure, providing the turning torque further may include providing the turning torque using the electric steering system. A magnitude of the turning torque is determined based at least in part on a magnitude of the accelerator input.

In another aspect of the present disclosure, the method further may include adjusting a torque-speed curve of the one or more electric motors based at least in part on a reference torque-speed curve obtained from a reference vehicle having an internal combustion engine.

According to several aspects, a system for controlling an electric vehicle is provided. The system may include one or more electric motors in mechanical communication with a first rear wheel on a first side of the electric vehicle and a second rear wheel on a second side of the electric vehicle. The system further may include an electric steering system in mechanical communication with one or more front wheels of the electric vehicle. The system further may include a controller in electrical communication with the one or more electric motors and the electric steering system. The controller is programmed to adjust an operation of the one or more electric motors of the electric vehicle to induce a loss of traction of the first rear wheel. The controller is further programmed to adjust an operation of the electric steering system of the electric vehicle to induce a yaw motion of the electric vehicle. A direction of the yaw motion is away from the first side of the electric vehicle.

In another aspect of the present disclosure, to adjust the operation of the one or more electric motors, the controller is further programmed to limit a first torque applied at the first rear wheel of the electric vehicle based on a first torque limit. To adjust the operation of the one or more electric motors, the controller is further programmed to limit a second torque applied at the second rear wheel of the electric vehicle based on a second torque limit. The second torque limit is less than or equal to the first torque limit for a least a portion of an acceleration time period. The second torque limit increases during the acceleration time period.

In another aspect of the present disclosure, the system further may include an accelerator pedal position sensor in electrical communication with the controller. To limit the first torque applied at the first rear wheel and to limit the second torque applied at the rear second wheel, the controller is further programmed to provide a substantially step-like increase in the first torque limit during the acceleration time period using the one or more electric motors in response to receiving an accelerator input using the accelerator pedal position sensor. To limit the first torque applied at the first rear wheel and to limit the second torque applied at the rear second wheel, the controller is further programmed to providing a first substantially ramp-like increase in the second torque limit in the second torque during the acceleration time period using the one or more electric motors in response to receiving the accelerator input using the accelerator pedal position sensor.

In another aspect of the present disclosure, to adjust the operation of the electric steering system, the controller is further programmed to provide a turning torque using the electric steering system in response to receiving the accelerator input using the accelerator pedal position sensor. The turning torque turns the one or more front wheels of the electric vehicle away from the first side of the electric vehicle.

In another aspect of the present disclosure, to provide the turning torque, the controller is further programmed to provide the turning torque using the electric steering system. A magnitude of the turning torque is determined based at least in part on a magnitude of the accelerator input.

In another aspect of the present disclosure, the controller is further programmed to adjust a torque-speed curve of the one or more electric motors based at least in part on a reference torque-speed curve obtained from a reference vehicle having an internal combustion engine.

In another aspect of the present disclosure, the system further includes a traction control system in electrical communication with the controller. The controller is further programmed to increase a slip threshold of a traction control system of the electric vehicle for the first rear wheel during the acceleration time period.

According to several aspects, a method for controlling an electric vehicle is provided. The method may include identifying a launch state of the electric vehicle. The method further may include adjusting an operation of one or more electric motors of the electric vehicle to induce a loss of traction of a first rear wheel of the electric vehicle on a first side of the electric vehicle during an acceleration time period in response to identifying the launch state. The method further may include adjusting an operation of an electric steering system of the electric vehicle to induce a yaw motion of the electric vehicle during the acceleration time period in response to identifying the launch state. A direction of the yaw motion is away from the first side of the electric vehicle. The method further may include increasing a slip threshold of a traction control system of the electric vehicle for the first rear wheel during the acceleration time period. The method further may include adjusting a torque-speed curve of the one or more electric motors during the acceleration time period based at least in part on a reference torque-speed curve obtained from a reference vehicle having an internal combustion engine.

In another aspect of the present disclosure, adjusting the operation of the one or more electric motors further may include providing a second substantially ramp-like increase in a first torque limit applied to the first rear wheel during the acceleration time period using the one or more electric motors in response to receiving an accelerator input. Adjusting the operation of the one or more electric motors further may include providing a third substantially ramp-like increase in a second torque limit applied to a second rear wheel during the acceleration time period using the one or more electric motors in response to receiving the accelerator input. A slope of the third substantially ramp-like increase is different from a slope of the second substantially ramp-like increase.

In another aspect of the present disclosure, adjusting the operation of the electric steering system further may include providing a turning torque using the electric steering system in response to receiving an accelerator input. The turning torque turns one or more wheels of the electric vehicle away from the first side of the electric vehicle. A magnitude of the turning torque is determined based at least in part on a magnitude of the accelerator input.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, advancements in electric propulsion and control systems have resulted in electric vehicles with well-defined, smooth, and predictable handling characteristics. However, automobile enthusiasts may desire to experience the raw, often less predictable handling characteristics of classic cars, such as, for example, American muscle cars from the 1960s. Therefore, the present disclosure provides a new and improved system and method for controlling an electric vehicle allowing for emulation of the handling characteristics of other vehicles.

Figure 1:
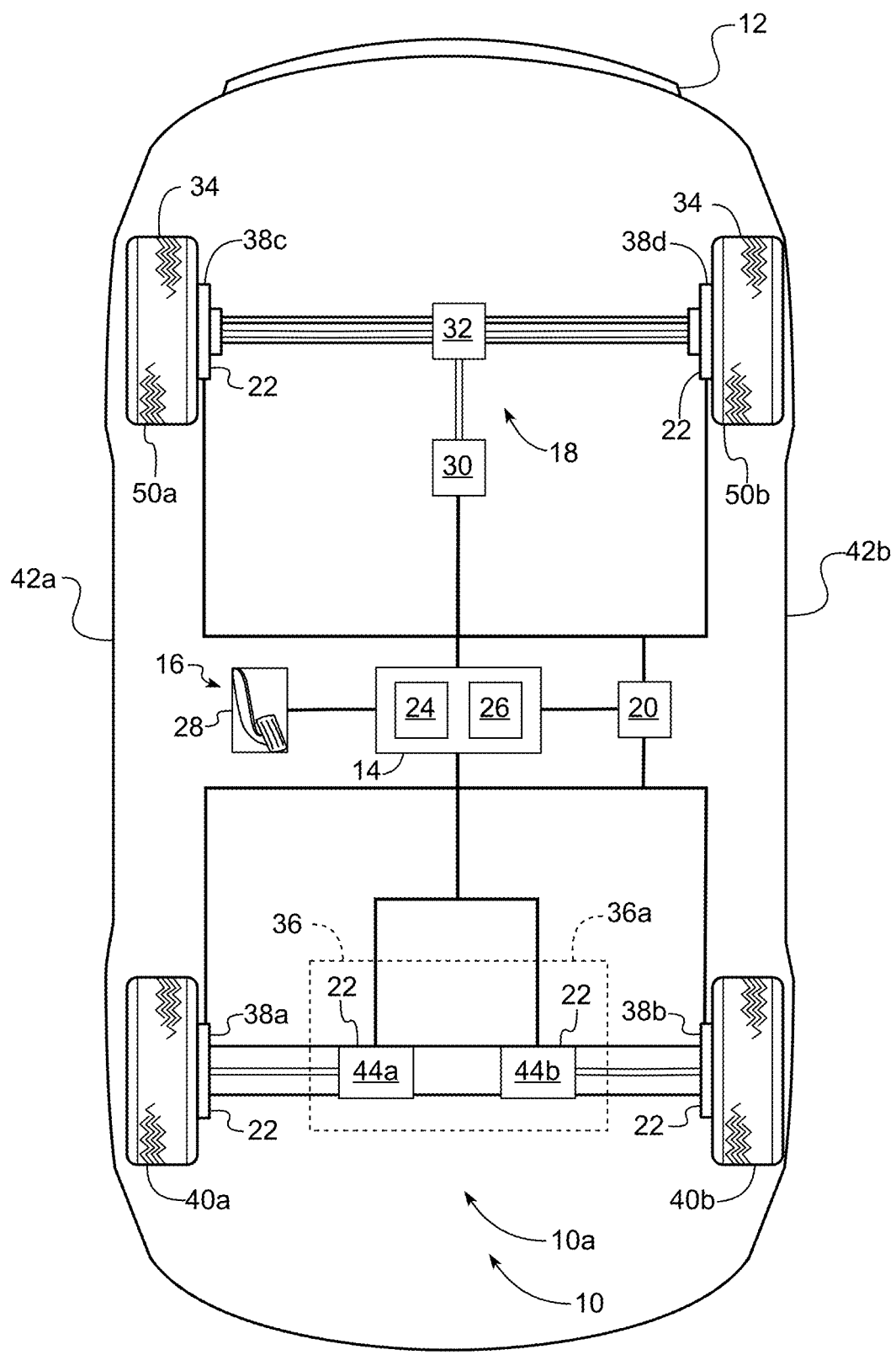
FIG. 1 is a schematic of a system for controlling an electric vehicle according to a first exemplary embodiment.

Referring to FIG. 1, a system for controlling an electric vehicle is illustrated and generally indicated by reference number 10. A first exemplary embodiment 10a of the system 10 is shown with an exemplary vehicle 12. While a passenger vehicle is illustrated, it should be appreciated that the vehicle 12 may be any type of vehicle without departing from the scope of the present disclosure. In an exemplary embodiment, the vehicle 12 is an electric vehicle. The first exemplary embodiment 10a of the system 10 generally includes a controller 14, one or more vehicle sensors 16, an electric steering system 18, a traction control system 20, and a plurality of drivetrain components 22.

The controller 14 is used to implement a method 100 for controlling an electric vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the one or more vehicle sensors 16, the electric steering system 18, the traction control system 20, and the plurality of drivetrain components 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The one or more vehicle sensors 16 are used to acquire information relevant to the vehicle 12. In an exemplary embodiment, the one or more vehicle sensors 16 includes at least an accelerator pedal position sensor 28.

The accelerator pedal position sensor 28 is used to measure a position of an accelerator pedal of the vehicle 12. In an exemplary embodiment, the accelerator pedal position sensor 28 is an electro-mechanical sensor which converts a mechanical movement of the accelerator pedal into an electrical signal. In a non-limiting example, the accelerator pedal position sensor 28 includes a potentiometer having at least a first terminal electrically connected to a wiper, and a second terminal. The wiper of the potentiometer is affixed (e.g., by way of a mechanical linkage, a gearset, and/or the like) to the accelerator pedal. Therefore, an electrical resistance measured between the first terminal (i.e., the wiper) and the second terminal is proportional to a position of the accelerator pedal. Accordingly, by measuring the electrical resistance between the first terminal and the second terminal of the potentiometer, the controller 14 determines a position of the accelerator pedal. It should be understood that additional sensors for measuring a position of the accelerator pedal (e.g., rotary encoders, proximity sensors, and the like) are within the scope of the present disclosure.

In another exemplary embodiment, the one or more vehicle sensors 16 further includes sensors to determine performance data about the vehicle 12. In a non-limiting example, the one or more vehicle sensors 16 further includes at least one of a motor speed sensor, a motor torque sensor, one or more wheel speed sensors, an electric drive motor voltage and/or current sensor, an accelerator pedal position sensor, a brake position sensor, a coolant temperature sensor, a cooling fan speed sensor, and a transmission oil temperature sensor.

In another exemplary embodiment, the one or more vehicle sensors 16 further includes sensors to determine information about an environment within the vehicle 12. In a non-limiting example, the one or more vehicle sensors 16 further includes at least one of a seat occupancy sensor, a cabin air temperature sensor, a cabin motion detection sensor, a cabin camera, a cabin microphone, and/or the like.

In another exemplary embodiment, the one or more vehicle sensors 16 further includes sensors to determine information about an environment surrounding the vehicle 12. In a non-limiting example, the one or more vehicle sensors 16 further includes at least one of an ambient air temperature sensor, a barometric pressure sensor, a global navigation satellite system (GNSS), and/or a photo and/or video camera which is positioned to view the environment in front of the vehicle 12.

In another exemplary embodiment, at least one of the one or more vehicle sensors 16 is a perception sensor capable of perceiving objects and/or measuring distances in the environment surrounding the vehicle 12. In a non-limiting example, the one or more vehicle sensors 16 includes a stereoscopic camera having distance measurement capabilities. In one example, at least one of the one or more vehicle sensors 16 is affixed inside of the vehicle 12, for example, in a headliner of the vehicle 12, having a view through a windscreen of the vehicle 12. In another example, at least one of the one or more vehicle sensors 16 is affixed outside of the vehicle 12, for example, on a roof of the vehicle 12, having a view of the environment surrounding the vehicle 12. It should be understood that various additional types of perception sensors, such as, for example, LiDAR sensors, ultrasonic ranging sensors, radar sensors, and/or time-of-flight sensors are within the scope of the present disclosure. The one or more vehicle sensors 16 are in electrical communication with the controller 14 as discussed above.

The electric steering system 18 is used to control a direction of travel and yaw motion of the vehicle 12 based on occupant inputs, advanced driver assistance system (ADAS) inputs, and/or automated driving system (ADS) inputs. In an exemplary embodiment, the electric steering system 18 includes a steering actuator 30 and a steering mechanism 32.

The steering actuator 30 is used to provide force or torque to the steering mechanism 32. In an exemplary embodiment, the steering actuator 30 is an electric motor, including, for example, a direct current (DC) electric motor, an alternating current (AC) electric motor, a linear actuator, and/or any other type of electric machine capable of providing force or torque to the steering mechanism 32. In another exemplary embodiment, the steering actuator 30 is an electro-hydraulic actuator including an electric hydraulic pump in fluid communication with one or more hydraulic actuators such as, for example, a hydraulic motor, a hydraulic piston, and/or the like. The steering actuator 30 is mechanically coupled to the steering mechanism 32 using one or more shafts, gears, rods, belts, chains, and/or the like. In a non-limiting example, the steering actuator 30 is in electrical communication with the controller 14, and an operation of the steering actuator 30 is controlled by the controller 14 based on occupant inputs, advanced driver assistance system (ADAS) inputs, and/or automated driving system (ADS) inputs.

The steering mechanism 32 is used to turn one or more front wheels 34 of the vehicle 12 using the force or torque provided by the steering actuator. In an exemplary embodiment, the steering mechanism 32 includes one or more mechanical components, such as, for example, shafts, gears, rods, belts, chains, and/or the like which are configured to turn the one or more front wheels 34 of the vehicle 12. In a non-limiting example, the steering mechanism 32 is a rack and pinion steering system. In another non-limiting example, the steering mechanism 32 is a recirculating ball steering system. It should be understood that various additional and/or alternative types, configurations, and functioning principles of the steering mechanism 32 are within the scope of the present disclosure.

The traction control system 20 is used to prevent wheel slip and enhance the stability of the vehicle 12. In an exemplary embodiment, the traction control system 20 is an electronic control system in electrical communication with the one or more vehicle sensors 16, the plurality of drivetrain components 22, and the controller 14. In a non-limiting example, the traction control system 20 uses the wheel speed sensors of the one or more vehicle sensors 16 to monitor the rotational speed of each wheel and compares the wheel speeds to detect wheel slip. In a non-limiting example, wheel slip is detected if a percent difference between wheel speeds exceeds a slip threshold. Upon detecting wheel slip, the traction control system adjusts one or more of the plurality of drivetrain components 22 to apply braking torque to the slipping wheel and may also modulate propulsion force provided by one or more of the plurality of drivetrain components 22 to maintain traction. It should be understood that various additional and/or alternative types, configurations, and functioning principles of the traction control system 20 are within the scope of the present disclosure. The traction control system 20 is in electrical communication with the controller 14. The controller 14 may control the operation of the traction control system 20 (e.g., by adjusting the slip threshold).

The plurality of drivetrain components 22 are used to provide propulsion and braking for the vehicle 12. In an exemplary embodiment, the plurality of drivetrain components 22 includes a rear propulsion system 36, a first rear brake 38a, a second rear brake 38b, a first front brake 38c, and a second front brake 38d.

The rear propulsion system 36 is used to provide torque to drive a first rear wheel 40a and a second rear wheel 40b (i.e., the rear wheels). The first rear wheel 40a is located on a first side 42a of the vehicle 12. The second rear wheel 40b is located on a second side 42b of the vehicle 12. In the first exemplary embodiment 10a of the system 10, the rear propulsion system 36 is a first exemplary rear propulsion system 36a. The first exemplary rear propulsion system 36a includes a first electric motor 44a and a second electric motor 44b. The first electric motor 44a is used to provide torque to drive (i.e., accelerate) the first rear wheel 40a. The second electric motor 44b is used to provide torque to drive (i.e., accelerate) the second rear wheel 40b.

In an exemplary embodiment, the first electric motor 44a and the second electric motor 44b are electric machines such as, for example, three-phase AC electric motors or DC electric motors. The first electric motor 44a and the second electric motor 44b are in electrical communication with the controller 14. The first electric motor 44a and the second electric motor 44b are controlled by the controller 14 based on occupant inputs, advanced driver assistance system (ADAS) inputs, and/or automated driving system (ADS) inputs.

Figure 2:
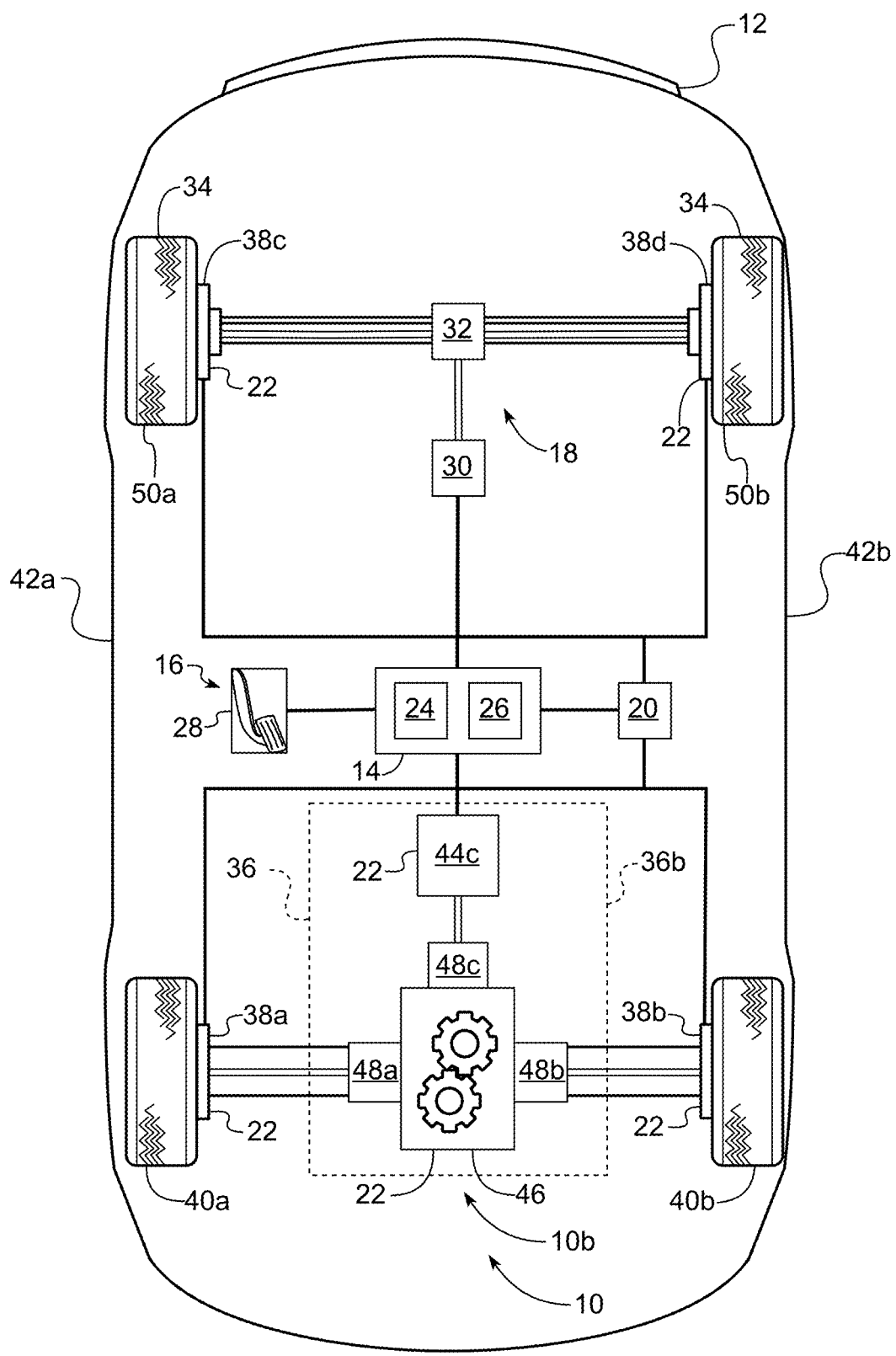
FIG. 2 is a schematic of the system for controlling an electric vehicle according to a second exemplary embodiment.

Referring to FIG. 2, a schematic diagram of a second exemplary embodiment 10b of the system 10 is shown. The second exemplary embodiment 10b of the system 10 generally includes the controller 14, the one or more vehicle sensors 16, the electric steering system 18, the traction control system 20, and the plurality of drivetrain components 22. The second exemplary embodiment 10b of the system 10 is similar to the first exemplary embodiment 10a of the system 10, except that in the second exemplary embodiment 10b of the system 10, the rear propulsion system 36 is a second exemplary rear propulsion system 36b. Besides differences in the rear propulsion system 36, all of the preceding and following disclosure is applicable to both the first exemplary embodiment 10a of the system 10 and the second exemplary embodiment 10b of the system 10 unless otherwise noted.

The second exemplary rear propulsion system 36b includes a single electric motor referred to as a third electric motor 44c, and a differential gearbox 46. The third electric motor 44c is used to provide torque to drive (i.e., accelerate) both the first rear wheel 40a and the second rear wheel 40b using the differential gearbox 46. In an exemplary embodiment, the third electric motor 44c is an electric machine such as, for example, a three-phase AC electric motor or a DC electric motor. The third electric motor 44c is in electrical communication with the controller 14. The third electric motor 44c is controlled by the controller 14 based on occupant inputs, advanced driver assistance system (ADAS) inputs, and/or automated driving system (ADS) inputs. The third electric motor 44c is mechanically coupled with the differential gearbox 46, as will be discussed below.

The differential gearbox 46 is used to transfer torque between the third electric motor 44c and both the first rear wheel 40a and the second rear wheel 40b. In an exemplary embodiment, the differential gearbox 46 includes a first port 48a, a second port 48b, and a third port 48c. The differential gearbox 46 further includes mechanical components such as, for example, gears, chains, belts, torque converters, and/or the like which facilitate torque transfer from the third port 48c to the first port 48a and the second port 48b. In a non-limiting example, the differential gearbox 46 is configured to transfer torque from the third port 48c to the first rear wheel 40a connected to (i.e., in mechanical communication with) the first port 48a and the second rear wheel 40b connected to (i.e., in mechanical communication with) the second port 48b. The differential gearbox 46 includes mechanical components allowing the first rear wheel 40a to rotate independently of the second rear wheel 40b (e.g., at different speeds and/or different directions).

Referring again to both FIGS. 1 and 2, it should be understood that the system 10 may include either the first exemplary rear propulsion system 36a (i.e., as is the case in the first exemplary embodiment 10a of the system 10 shown in FIG. 1) or the second exemplary rear propulsion system 36b (i.e., as is the case in the second exemplary embodiment 10b of the system 10 shown in FIG. 2). As discussed above, the first exemplary embodiment 10a of the system 10 and the second exemplary embodiment 10b of the system 10 are similar besides differences in the rear propulsion system 36. Differences in operation between the first exemplary embodiment 10a of the system 10 and the second exemplary embodiment 10b of the system 10 will be discussed in greater detail below.

The first rear brake 38a, the second rear brake 38b, the first front brake 38c, and the second front brake 38d are used to provide torque to brake (i.e., decelerate) the vehicle 12. The first rear brake 38a is operable to provide a braking torque on the first rear wheel 40a. The second rear brake 38b is operable to provide a braking torque on the second rear wheel 40b. The first front brake 38c is operable to provide a braking torque on a first front wheel 50a of the one or more front wheels 34. The first front wheel 50a is on located the first side 42a. The second front brake 38d is operable to provide a braking torque on a second front wheel 50b of the one or more front wheels 34. The second front wheel 50b is on located the second side 42b. The first rear brake 38a and the second rear brake 38b are also referred to as rear brakes. The first front brake 38c and the second front brake 38d are also referred to as front brakes.

In an exemplary embodiment, the first rear brake 38a, the second rear brake 38b, the first front brake 38c, and the second front brake 38d are hydraulically actuated brakes which are connected to a central vehicle hydraulic system (not shown). The hydraulically actuated brakes may be actuated using a brake pedal force applied by an occupant or by an electronically controlled hydraulic pump and/or manifold system capable of individually controlling brake pressure applied to each of the first rear brake 38a, the second rear brake 38b, the first front brake 38c, and the second front brake 38d. In another exemplary embodiment, the first rear brake 38a, the second rear brake 38b, the first front brake 38c, and the second front brake 38d are self-contained electro-mechanical brakes (EMB) or electro-hydraulic brakes (EHB) which are individually electronically controlled as part of a brake-by-wire system. It should be understood that any braking system operable to provide individually electronically controllable braking torque on each of the first rear wheel 40a, the second rear wheel 40b, the first front wheel 50a, and the second front wheel 50b, including, for example, regenerative braking systems, is within the scope of the present disclosure.

In any case, the first rear brake 38a, the second rear brake 38b, the first front brake 38c, and the second front brake 38d are directly or indirectly in electrical communication with the controller 14, allowing for electronically controlled individual actuation of the first rear brake 38a, the second rear brake 38b, the first front brake 38c, and the second front brake 38d to apply braking torque on the first rear wheel 40a, the second rear wheel 40b, the first front wheel 50a, and the second front wheel 50b.

Figure 3:
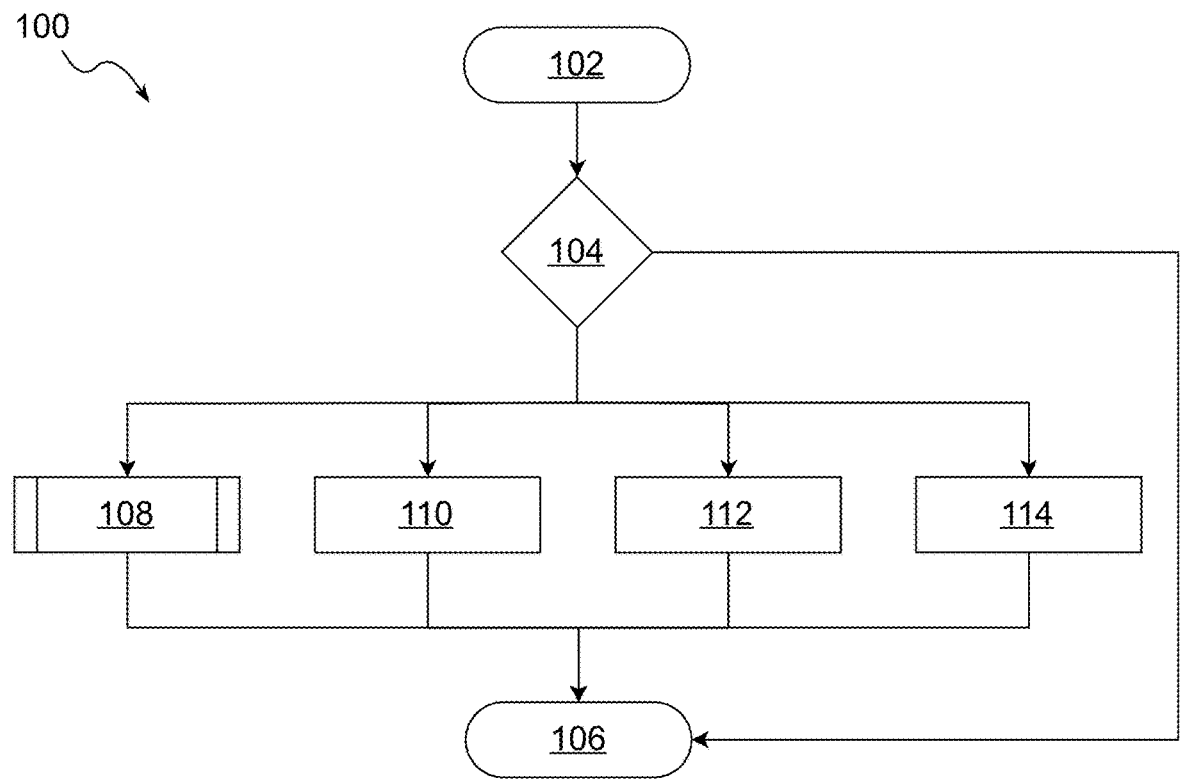
FIG. 3 is a flowchart of a method for controlling an electric vehicle according to an exemplary embodiment.

Referring to FIG. 3, a flowchart of the method 100 for controlling an electric vehicle is shown. The method 100 begins at block 102 and proceeds to block 104. At block 104, the controller 14 identifies a launch state of the vehicle 12. In the scope of the present disclosure, the launch state means that the vehicle 12 is configured for rapid acceleration from a stationary or low-speed state. In an exemplary embodiment, the launch state is enabled by an occupant of the vehicle 12 (e.g., by selecting a launch option using a physical and/or software button or switch). In another exemplary embodiment, the launch state is identified using the accelerator pedal position sensor 28. In a non-limiting example, the controller 14 uses the accelerator pedal position sensor 28 to detect a large magnitude change in the accelerator pedal position over a relatively short time period. The launch state is identified in response to determining that a magnitude in the change of the accelerator pedal position over a predetermined time period (e.g., one second) is greater than or equal to a predetermined accelerator pedal position change threshold.

In any case, the launching behavior of the vehicle 12 (i.e., a rapid forward acceleration from a stationary or low-speed state) is initiated by an accelerator input (i.e., an actuation of the accelerator pedal) provided by the occupant of the vehicle 12 and detected by the accelerator pedal position sensor 28. If the launch state is not identified at block 104, the method 100 proceeds to enter a standby state at block 106. If the launch state is identified at block 104 and the accelerator input is received, the method 100 proceeds to blocks 108, 110, 112, and 114.

At block 108, the controller 14 applies a first torque at the first rear wheel 40a based on a first torque limit. The controller 14 also applies a second torque at the second rear wheel 40b based on a second torque limit. The application of the first torque and the second torque will be discussed in greater detail below. After block 108, the method 100 proceeds to enter the standby state at block 106.

At block 110, the controller 14 commands the traction control system 20 to increase the slip threshold of the first rear wheel 40a. In a non-limiting example, the slip threshold of the first rear wheel 40a is increased to fifteen percent. Increasing the slip threshold allows the first rear wheel 40a to slip more before the traction control system 20 intervenes to reduce slipping. Adjustment of the slip threshold will be discussed in greater detail below. After block 110, the method 100 proceeds to enter the standby state at block 106.

At block 112, the controller 14 commands the electric steering system 18 to provide a turning torque. In an exemplary embodiment, the turning torque turns the one or more front wheels 34 away from the first side 42a of the vehicle 12 (i.e., the one or more front wheels 34 would turn to the right as viewed from the perspective of FIGS. 1-2 and as viewed from the perspective of an occupant in the vehicle facing forward). In another exemplary embodiment, the turning torque turns the one or more front wheels 34 away from the second side 42b of the vehicle 12 (i.e., the one or more front wheels 34 would turn to the left as viewed from the perspective of FIGS. 1-2 and as viewed from the perspective of an occupant in the vehicle facing forward). In an exemplary embodiment, a magnitude of the turning torque is determined based at least in part on a magnitude of the accelerator input detected at block 104 to initiate the launching behavior. In a non-limiting example, the magnitude of the turning torque varies directly with the magnitude of the accelerator input detected at block 104, such that a larger accelerator input results in a larger magnitude turning torque. Application of the turning torque will be discussed in greater detail below. After block 112, the method 100 proceeds to enter the standby state at block 106.

At block 114, the controller 14 adjusts a torque-speed curve of the first electric motor 44a, the second electric motor 44b, and/or the third electric motor 44c. In the scope of the present disclosure, the torque-speed curve of a motor characterizes the performance of the motor in terms of how the torque output of the motor varies with motor speed.

Figure 4:
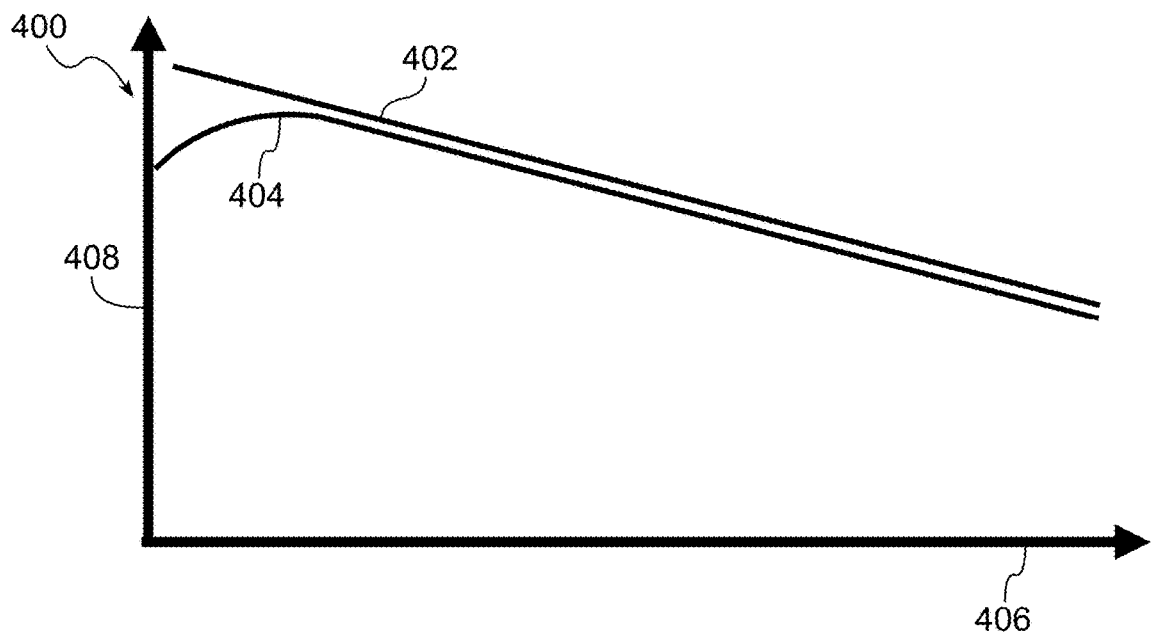
FIG. 4 is a torque-speed graph according to an exemplary embodiment.

Referring to FIG. 4, an exemplary torque-speed graph 400 including a typical electric torque-speed curve 402 and a reference torque-speed curve 404 is shown. The exemplary torque-speed graph 400 includes an x-axis 406 representing motor speed (e.g., in units of revolutions per minute) and a y-axis 408 representing motor torque (e.g., in units of Newton-meters). In an exemplary embodiment, the typical electric torque-speed curve 402 represents a typical torque-speed curve of an electric motor (i.e., the first electric motor 44a, the second electric motor 44b, and/or the third electric motor 44c). The typical electric torque-speed curve 402 is characterized by immediate availability of maximum torque at low motor speed followed by a reduction in torque as motor speed increases. It should be understood that the typical electric torque-speed curve 402 shown in FIG. 4 is merely exemplary in nature, and that the actual typical torque-speed curve of the first electric motor 44a, the second electric motor 44b, and/or the third electric motor 44c may differ.

The reference torque-speed curve 404 represents a typical torque-speed curve of a combustion motor (e.g., a gasoline internal combustion engine). The reference torque-speed curve 404 is characterized by a lower available torque at low motor speed, with motor torque reaching a peak within a particular motor speed range (sometimes referred to as the "power band"), followed by a reduction in torque as motor speed increases. In an exemplary embodiment, the reference torque-speed curve 404 is obtained from a reference vehicle (not shown) having an internal combustion engine (not shown). In a non-limiting example, the reference vehicle is tested on a dynamometer (not shown) to obtain the reference torque-speed curve 404. It should be understood that the reference torque-speed curve 404 shown in FIG. 4 is merely exemplary in nature, and that the actual torque-speed curve obtained from the reference vehicle may differ.

In an exemplary embodiment, to adjust the torque-speed curve of the first electric motor 44a, the second electric motor 44b, and/or the third electric motor 44c, the controller 14 limits the torque supplied by the first electric motor 44a, the second electric motor 44b, and/or the third electric motor 44c at low motor speeds such that the torque-speed curve of the first electric motor 44a, the second electric motor 44b, and/or the third electric motor 44c more closely matches that of the reference torque-speed curve 404. In other words, the controller 14 emulates, using software-based motor control, the torque-speed characteristics of the reference vehicle's engine using the first electric motor 44a, the second electric motor 44b, and/or the third electric motor 44c. Referring again to FIG. 3, after block 114, the method 100 proceeds to enter the standby state at block 106.

Figure 5:
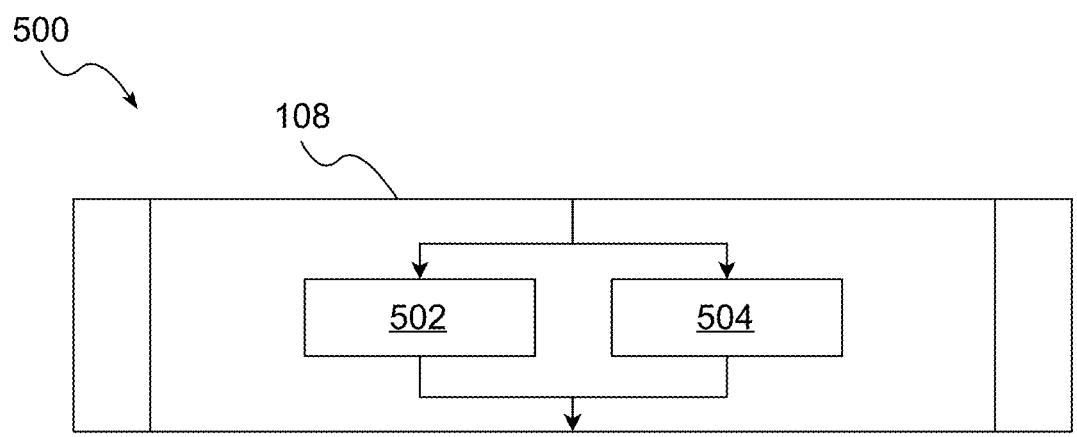
FIG. 5 is a flowchart of a first method for applying a first torque and a second torque according to an exemplary embodiment.

Referring to FIG. 5, a flowchart of a first exemplary embodiment 500 of block 108 (i.e., a first method for applying the first torque and the second torque) is shown. In an exemplary embodiment, the first exemplary embodiment 500 of block 108 is used with the first exemplary embodiment 10a of the system 10 having the first exemplary rear propulsion system 36a. The first exemplary embodiment 500 of block 108 begins at blocks 502 and 504. With reference to FIG. 5 and continued reference to FIGS. 1 and 3, at block 502, the controller 14 uses the first electric motor 44a to apply the first torque to the first rear wheel 40a based on the first torque limit. In an exemplary embodiment, the first torque limit is equal to a maximum output torque of the first electric motor 44a, as determined by the torque-speed curve discussed above in reference to block 114. Examples of the first torque limit will be discussed in greater detail below. After block 502, the first exemplary embodiment 500 of block 108 is concluded, and the method 100 proceeds as discussed above.

At block 504, the controller 14 uses the second electric motor 44b to apply the second torque to the second rear wheel 40b based on the second torque limit. In an exemplary embodiment, the second torque limit is less than or equal to the first torque limit. The first torque limit is higher than the second torque limit such as to induce loss of traction of the first rear wheel 40a. In an exemplary embodiment, the second torque limit increases over time. Examples of the second torque limit will be discussed in greater detail below. After block 504, the first exemplary embodiment 500 of block 108 is concluded, and the method 100 proceeds as discussed above.

Figure 6:
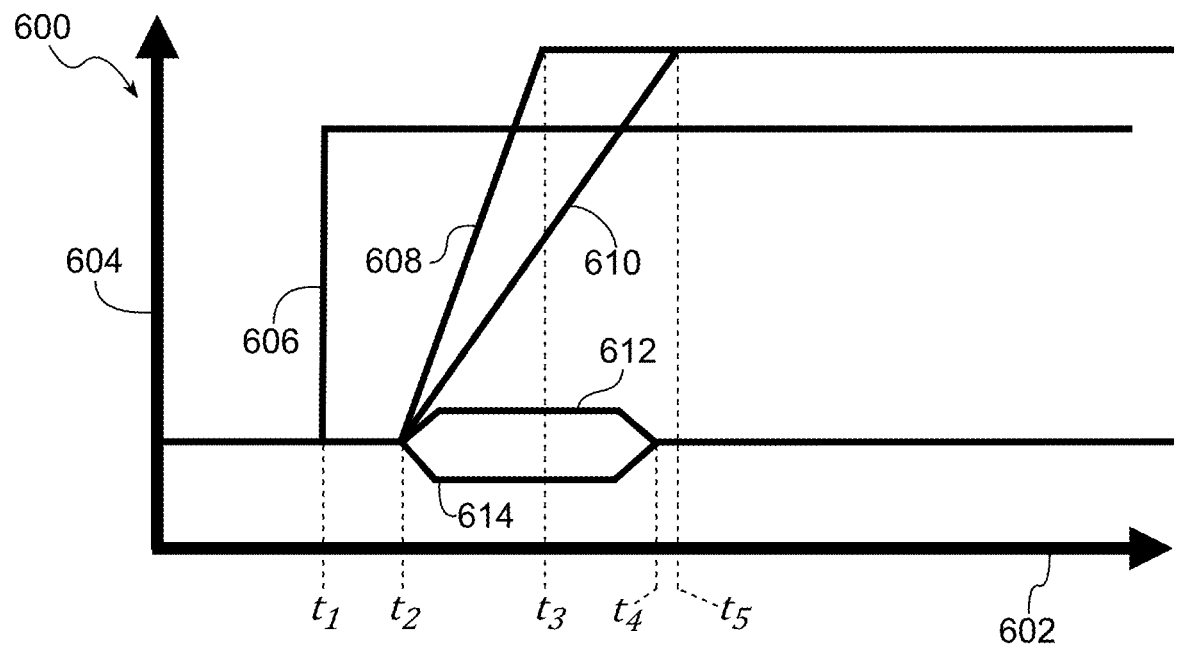
FIG. 6 is a torque limit graph according to a first exemplary embodiment.

Referring to FIG. 6, a first exemplary torque limit graph 600 is shown. The first exemplary torque limit graph 600 includes an x-axis 602 indicating time (e.g., in seconds) and a y-axis 604 indicating magnitude on a relative scale. It should be understood that the first exemplary torque limit graph 600 is not necessarily to scale, and that all indicated times and magnitudes are exemplary in nature. The first exemplary torque limit graph 600 further includes an exemplary accelerator input 606 over time. In an exemplary embodiment, the exemplary accelerator input 606 is a step-like increase of the accelerator pedal position at time $t_1$, consistent with, for example, the occupant fully depressing the accelerator pedal to initiate the launching behavior. It should be understood that the shape of the exemplary accelerator input 606 is merely exemplary in nature, and that the exemplary accelerator input 606 may not change instantaneously.

The first exemplary torque limit graph 600 further includes a first exemplary first torque limit 608. In an exemplary embodiment, the first exemplary first torque limit 608 is a linear, ramp-like increase of the first torque limit beginning at time $t_2$ and reaching a maximum value (e.g., one hundred percent of capable torque) at time $t_3$. In the scope of the present disclosure, ramp-like means that the shape of the first torque limit is a ramp-function. In the scope of the present disclosure, substantially ramp-like means that the first torque limit is very similar to a ramp-function, but may also include additional artifacts such as slewing, oscillation, ringing, and/or the like without departing from the scope of the present disclosure. The time between $t_1$ and $t_2$ is a deadtime or reaction time of the system. It should be understood that the first exemplary first torque limit 608 is merely exemplary in nature, and that the first exemplary first torque limit 608 may have any slope and/or may include piecewise or non-linear functions.

In another exemplary embodiment, the first torque limit is substantially step-like. In the scope of the present disclosure, step-like means that the shape of the first torque limit is a step-function increase (e.g., as depicted with the exemplary accelerator input 606). In the scope of the present disclosure, substantially step-like means that the first torque limit is very similar to a step-function response, but may also include additional artifacts such as slewing, oscillation, ringing, and/or the like without departing from the scope of the present disclosure.

The first exemplary torque limit graph 600 further includes a first exemplary second torque limit 610. In an exemplary embodiment, the first exemplary second torque limit 610 is a linear, ramp-like increase of the second torque limit beginning at time $t_2$ and reaching a maximum value (e.g., one hundred percent of capable torque) at time $t_5$. In the scope of the present disclosure, ramp-like means that the shape of the second torque limit is a ramp-function increase. In the scope of the present disclosure, substantially ramp-like means that the second torque limit is very similar to a ramp-function response, but may also include additional artifacts such as slewing, oscillation, ringing, and/or the like without departing from the scope of the present disclosure. The time between $t_1$ and $t_2$ is a deadtime or reaction time of the system. It should be understood that the first exemplary second torque limit 610 is merely exemplary in nature, and that the first exemplary second torque limit 610 may have any slope and/or may include piecewise or non-linear functions. In a non-limiting example, the first exemplary second torque limit 610 has a lower slope than the first exemplary first torque limit 608 such that the second torque limit is less than or equal to the first torque limit, as discussed above.

The first exemplary torque limit graph 600 further includes a first exemplary slip threshold 612 of the first rear wheel 40a. In an exemplary embodiment, the first exemplary slip threshold 612 is a temporary increase in the slip threshold of the first rear wheel 40a beginning at time $t_2$ and returning to a baseline slip threshold at time $t_4$. It should be understood that the timing of the changes in the first exemplary slip threshold 612 are merely exemplary in nature. For example, the first exemplary slip threshold 612 may also begin at time $t_3$ and return to the baseline slip threshold at time $t_5$ without departing from the scope of the present disclosure. It should be understood that the first exemplary slip threshold 612 is merely exemplary in nature, and that the first exemplary slip threshold 612 may have any shape, including piecewise and/or non-linear functions.

The first exemplary torque limit graph 600 further includes a first exemplary turning torque 614. In an exemplary embodiment, the first exemplary turning torque 614 is a temporary decrease in the turning torque below a baseline turning torque (e.g., zero turning torque or a current turning torque inputted by the occupant or an ADAS/ADS system) beginning at time $t_2$ and returning to the baseline turning torque at time $t_4$. The decrease below the baseline turning torque corresponds to turning the one or more front wheels 34 of the vehicle 12 away from the first side 42a of the vehicle 12. It should be understood that the timing of the changes in the first exemplary turning torque 614 are merely exemplary in nature. For example, the first exemplary turning torque 614 may also begin at time $t_2$ and return to the baseline turning torque at time $t_3$ without departing from the scope of the present disclosure. It should be understood that the first exemplary turning torque 614 is merely exemplary in nature, and that the first exemplary turning torque 614 may have any shape, including piecewise and/or non-linear functions.

In the first exemplary torque limit graph 600, the time between $t_1$ and $t_5$ is referred to as an acceleration time period. In the scope of the present disclosure, the acceleration time period is a time period within which any of the first torque limit, the second torque limit, the slip threshold, and/or the turning torque are changing or vary from baseline levels.

Figure 7:
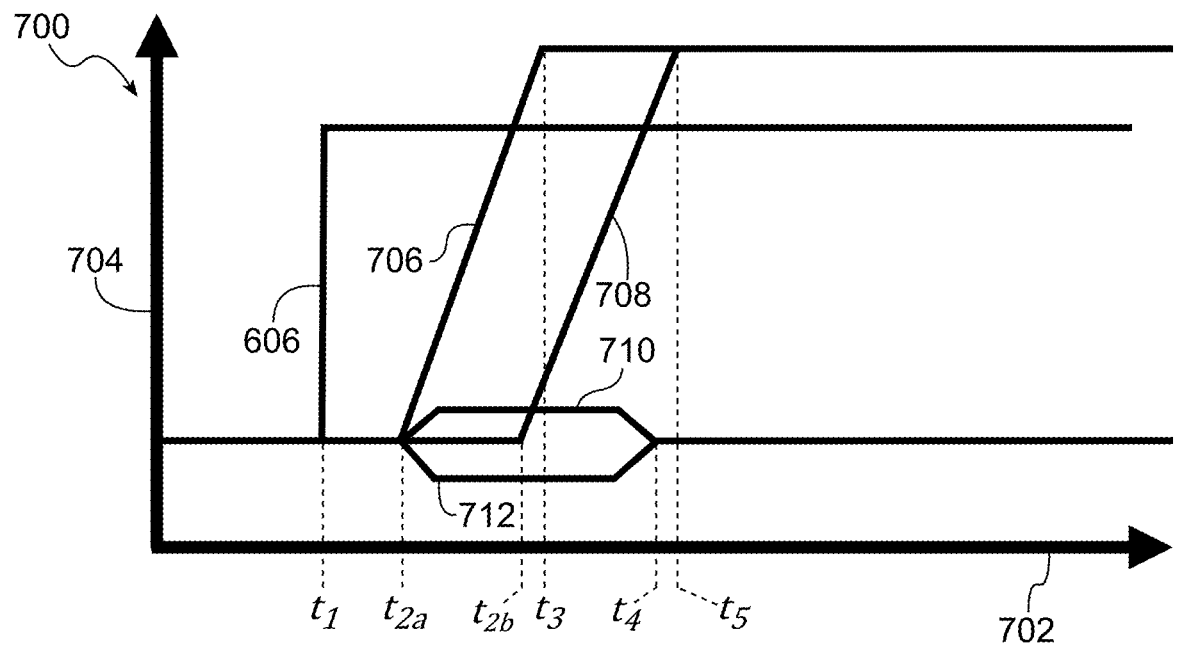
FIG. 7 is a torque limit graph according to a second exemplary embodiment.

Referring to FIG. 7, a second exemplary torque limit graph 700 is shown. The second exemplary torque limit graph 700 includes an x-axis 702 indicating time (e.g., in seconds) and a y-axis 704 indicating magnitude on a relative scale. It should be understood that the second exemplary torque limit graph 700 is not necessarily to scale, and that all indicated times and magnitudes are exemplary in nature. The second exemplary torque limit graph 700 further includes the exemplary accelerator input 606 over time, as discussed above.

The second exemplary torque limit graph 700 further includes a second exemplary first torque limit 706. In an exemplary embodiment, the second exemplary first torque limit 706 is a linear, ramp-like increase of the first torque limit beginning at time $t_{2a}$ and reaching a maximum value (e.g., one hundred percent of capable torque) at time $t_3$. The time between $t_1$ and $t_{2a}$ is a deadtime or reaction time of the system. It should be understood that the second exemplary first torque limit 706 is merely exemplary in nature, and that the second exemplary first torque limit 706 may have any slope and/or may include piecewise or non-linear functions.

In another exemplary embodiment, the first torque limit is substantially step-like. In the scope of the present disclosure, step-like means that the shape of the first torque limit is a step-function increase (e.g., as depicted with the exemplary accelerator input 606). In the scope of the present disclosure, substantially step-like means that the first torque limit is very similar to a step-function response, but may also include additional artifacts such as slewing, oscillation, ringing, and/or the like without departing from the scope of the present disclosure.

The second exemplary torque limit graph 700 further includes a second exemplary second torque limit 708. In an exemplary embodiment, the second exemplary second torque limit 708 is a linear, ramp-like increase of the second torque limit beginning at time $t_{2b}$ and reaching a maximum value (e.g., one hundred percent of capable torque) at time $t_5$. Therefore, as shown in FIG. 7, the start time of the second exemplary second torque limit 708 (i.e., $t_{2b}$) occurs after the start time of the second exemplary first torque limit 706 (i.e., $t_{2a}$). Accordingly, the second torque limit is less than or equal to the first torque limit as discussed above. The first torque limit is higher than the second torque limit such as to induce loss of traction of the first rear wheel 40a. It should be understood that the second exemplary second torque limit 708 is merely exemplary in nature, and that the second exemplary second torque limit 708 may have any slope and/or may include piecewise or non-linear functions.

The second exemplary torque limit graph 700 further includes a second exemplary slip threshold 710 of the first rear wheel 40a. In an exemplary embodiment, the second exemplary slip threshold 710 is a temporary increase in the slip threshold of the first rear wheel 40a beginning at time $t_{2a}$ and returning to a baseline slip threshold at time $t_4$. It should be understood that the timing of the changes in the second exemplary slip threshold 710 are merely exemplary in nature. For example, the second exemplary slip threshold 710 may also begin at time $t_3$ and return to the baseline slip threshold at time $t_5$ without departing from the scope of the present disclosure. It should be understood that the second exemplary slip threshold 710 is merely exemplary in nature, and that the second exemplary slip threshold 710 may have any shape, including piecewise and/or non-linear functions.

The second exemplary torque limit graph 700 further includes a second exemplary turning torque 712. In an exemplary embodiment, the second exemplary turning torque 712 is a temporary decrease in the turning torque below a baseline turning torque (e.g., zero turning torque or a current turning torque inputted by the occupant or an ADAS/ADS system) beginning at time $t_{2a}$ and returning to the baseline turning torque at time $t_4$. The decrease below the baseline turning torque corresponds to turning the one or more front wheels 34 of the vehicle 12 away from the first side 42a of the vehicle 12. It should be understood that the timing of the changes in the second exemplary turning torque 712 are merely exemplary in nature. For example, the second exemplary turning torque 712 may also begin at time $t_{2a}$ and return to the baseline turning torque at time $t_3$ without departing from the scope of the present disclosure. It should be understood that the second exemplary turning torque 712 is merely exemplary in nature, and that the second exemplary turning torque 712 may have any shape, including piecewise and/or non-linear functions.

In the second exemplary torque limit graph 700, the time between $t_1$ and $t_5$ is referred to as the acceleration time period. In the scope of the present disclosure, the acceleration time period is a time period within which any of the first torque limit, the second torque limit, the slip threshold, and/or the turning torque are changing or vary from baseline levels.

Figure 8:
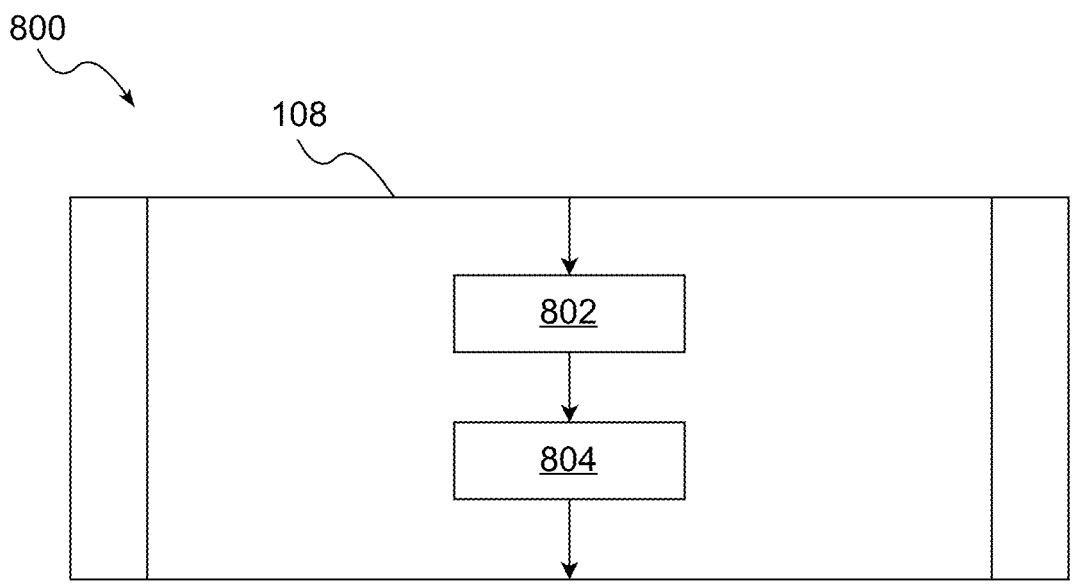
FIG. 8 is a flowchart of second first method for applying the first torque and the second torque according to an exemplary embodiment.

Referring to FIG. 8, a flowchart of a second exemplary embodiment 800 of block 108 (i.e., a second method for applying the first torque and the second torque) is shown. In an exemplary embodiment, the second exemplary embodiment 800 of block 108 is used with the second exemplary embodiment 10b of the system 10 having the second exemplary rear propulsion system 36b. The second exemplary embodiment 800 of block 108 begins at block 802. With reference to FIG. 8 and continued reference to FIGS. 2 and 3, at block 802, the controller 14 uses the third electric motor 44c to apply a third torque to the third port 48c of the differential gearbox 46. In an exemplary embodiment, the third torque is equal to a maximum output torque of the third electric motor 44c, as determined by the torque-speed curve discussed above in reference to block 114. After block 802, the second exemplary embodiment 800 of block 108 proceeds to block 804.

At block 804, the controller 14 uses the second rear brake 38b to apply a braking torque at the second rear wheel 40b. In an exemplary embodiment, the braking torque results in torque transfer from the second rear wheel 40b to the first rear wheel 40a via the differential gearbox 46. In a non-limiting example, the magnitude of the braking torque is determined such as to limit the second torque applied at the second rear wheel 40b by the third electric motor 44c based at least in part on the second torque limit and to limit the first torque applied at the first rear wheel 40a by the third electric motor 44c based at least in part on the first torque limit. After block 804, the second exemplary embodiment 800 of block 108 is concluded, and the method 100 proceeds as discussed above.

Figure 9:
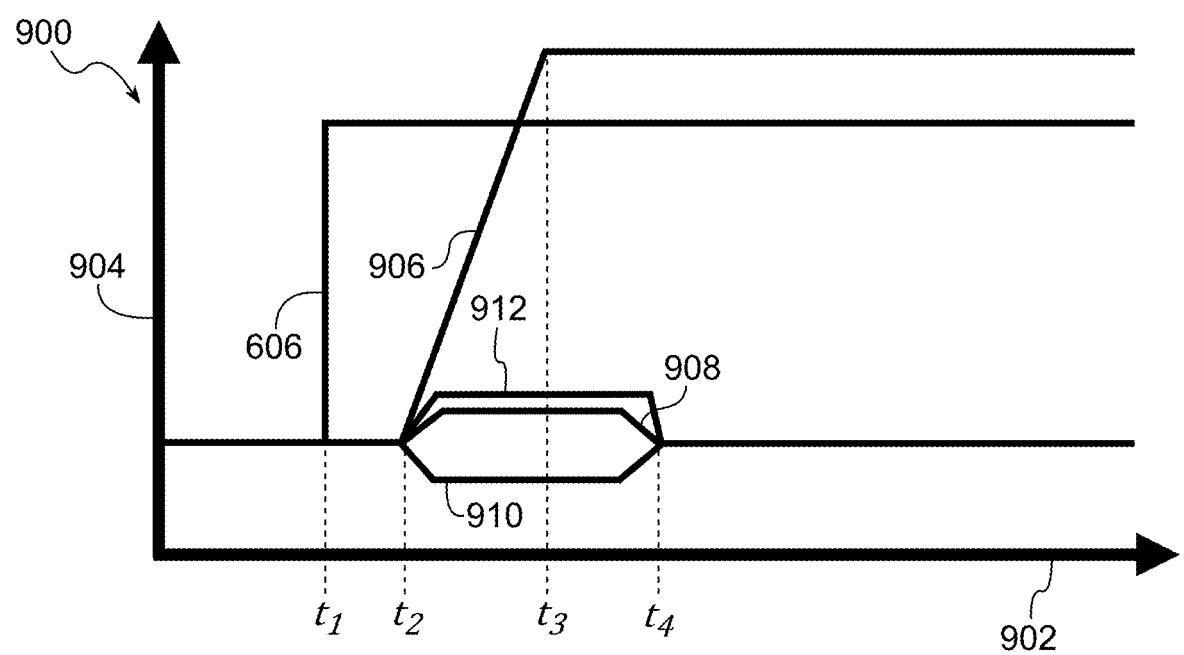
FIG. 9 is a torque limit graph according to a third exemplary embodiment.

Referring to FIG. 9, a third exemplary torque limit graph 900 is shown. The third exemplary torque limit graph 900 includes an x-axis 902 indicating time (e.g., in seconds) and a y-axis 904 indicating magnitude on a relative scale. It should be understood that the third exemplary torque limit graph 900 is not necessarily to scale, and that all indicated times and magnitudes are exemplary in nature. The third exemplary torque limit graph 900 further includes the exemplary accelerator input 606 over time, as discussed above.

The third exemplary torque limit graph 900 further includes an exemplary third torque 906. In an exemplary embodiment, the exemplary third torque 906 is a linear, ramp-like increase of the third torque beginning at time $t_2$ and reaching a maximum value (e.g., one hundred percent of capable torque) at time $t_3$. The time between $t_1$ and $t_2$ is a deadtime or reaction time of the system. It should be understood that the exemplary third torque 906 is merely exemplary in nature, and that the exemplary third torque 906 may have any slope and/or may include piecewise or non-linear functions.

In another exemplary embodiment, the third torque is substantially step-like. In the scope of the present disclosure, step-like means that the shape of the third torque is a step-function increase (e.g., as depicted with the exemplary accelerator input 606). In the scope of the present disclosure, substantially step-like means that the third torque is very similar to a step-function response, but may also include additional artifacts such as slewing, oscillation, ringing, and/or the like without departing from the scope of the present disclosure.

The third exemplary torque limit graph 900 further includes a third exemplary slip threshold 908 of the first rear wheel 40a. In an exemplary embodiment, the third exemplary slip threshold 908 is a temporary increase in the slip threshold of the first rear wheel 40a beginning at time $t_2$ and returning to a baseline slip threshold at time $t_4$. It should be understood that the timing of the changes in the third exemplary slip threshold 908 are merely exemplary in nature. For example, the third exemplary slip threshold 908 may also begin at time $t_3$ and return to the baseline slip threshold at time $t_5$ without departing from the scope of the present disclosure. It should be understood that the third exemplary slip threshold 908 is merely exemplary in nature, and that the third exemplary slip threshold 908 may have any shape, including piecewise and/or non-linear functions.

The third exemplary torque limit graph 900 further includes a third exemplary turning torque 910. In an exemplary embodiment, the third exemplary turning torque 910 is a temporary decrease in the turning torque below a baseline turning torque (e.g., zero turning torque or a current turning torque inputted by the occupant or an ADAS/ADS system) beginning at time $t_2$ and returning to the baseline turning torque at time $t_4$. The decrease below the baseline turning torque corresponds to turning the one or more front wheels 34 of the vehicle 12 away from the first side 42a of the vehicle 12. It should be understood that the timing of the changes in the third exemplary turning torque 910 are merely exemplary in nature. For example, the third exemplary turning torque 910 may also begin at time $t_2$ and return to the baseline turning torque at time $t_3$ without departing from the scope of the present disclosure. It should be understood that the third exemplary turning torque 910 is merely exemplary in nature, and that the third exemplary turning torque 910 may have any shape, including piecewise and/or non-linear functions.

The third exemplary torque limit graph 900 further includes an exemplary braking torque 912. In an exemplary embodiment, the exemplary braking torque 912 is a temporary increase in the braking torque above a baseline braking torque (e.g., zero braking torque or a current braking torque inputted by the occupant or an ADAS/ADS system) beginning at time $t_2$ and returning to the baseline braking torque at time $t_4$. The increase above the baseline braking torque corresponds to applying the second rear brake 38b to transfer torque from the second rear wheel 40b to the first rear wheel 40a. The transfer of torque from the second rear wheel 40b to the first rear wheel 40a serves to induce loss of traction of the first rear wheel 40a.

It should be understood that the timing of the changes in the exemplary braking torque 912 are merely exemplary in nature. For example, the exemplary braking torque 912 may also begin at time $t_2$ and return to the baseline braking torque at time $t_3$ without departing from the scope of the present disclosure. It should be understood that the exemplary braking torque 912 is merely exemplary in nature, and that the exemplary braking torque 912 may have any shape, including piecewise and/or non-linear functions.

In the third exemplary torque limit graph 900, the time between $t_1$ and $t_4$ is referred to as the acceleration time period. In the scope of the present disclosure, the acceleration time period is a time period within which any of the third torque, the slip threshold, the braking torque, and/or the turning torque are changing or vary from baseline levels.

The system 10 and method 100 of the present disclosure offer several advantages. Using the system 10 and method 100, a loss of traction of the first rear wheel 40a is induced. Furthermore, a yaw motion in a direction away from the first side 42a is induced. The loss of traction of the first rear wheel 40a and the yaw motion emulates the performance of a classic muscle car, providing increased occupant enjoyment and entertainment.

In an exemplary embodiment, the system 10 and method 100 may also be configured to induce loss of traction in the second rear wheel 40b and induce a yaw motion in a direction toward the first side 42a of the vehicle 12. In a non-limiting example, the occupant may configure, using a human-machine interface, parameters such as tire slip (e.g., which tire slips, magnitude of tire slip, and/or the like) and yaw direction. In another non-limiting example, the controller 14 may randomize parameters such as tire slip and yaw direction. Therefore, by using the system 10 and method 100, the driving experience may be made more interesting and challenging, providing additional entertainment for the occupant.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling an electric vehicle, the method comprising:
   adjusting an operation of one or more electric motors of the electric vehicle to induce a loss of traction of a first wheel of the electric vehicle on a first side of the electric vehicle; and
   adjusting an operation of an electric steering system of the electric vehicle to induce a yaw motion of the electric vehicle, wherein a direction of the yaw motion is away from the first side of the electric vehicle.

2. The method of claim 1, wherein adjusting the operation of the one or more electric motors further comprises:
   limiting a first torque applied at the first wheel of the electric vehicle based on a first torque limit; and
   limiting a second torque applied at a second wheel of the electric vehicle based on a second torque limit, wherein the second torque limit is less than or equal to the first torque limit for a least a portion of an acceleration time period, and wherein the second torque limit increases during the acceleration time period.

3. The method of claim 2, wherein limiting the first torque applied at the first wheel and limiting the second torque applied at the second wheel further comprises:
   applying the first torque at the first wheel using a first electric motor of the one or more electric motors based at least in part on the first torque limit; and
   applying the second torque at the second wheel using a second electric motor of the one or more electric motors based at least in part on the second torque limit.

4. The method of claim 2, wherein limiting the first torque applied at the first wheel and limiting the second torque applied at the second wheel further comprises:
   applying a third torque to a differential gearbox of the electric vehicle using a third electric motor of the one or more electric motors, wherein the differential gearbox is in mechanical communication with the third electric motor, the first wheel, and the second wheel; and
   applying a braking torque at the second wheel to limit the second torque based at least in part on the second torque limit and limit the first torque based at least in part on the first torque limit.

5. The method of claim 2, further comprising:
   increasing a slip threshold of a traction control system of the electric vehicle for the first wheel during the acceleration time period.

6. The method of claim 2, wherein limiting the first torque applied at the first wheel and limiting the second torque applied at the second wheel further comprises:
   providing a substantially step-like increase in the first torque limit during the acceleration time period using the one or more electric motors in response to receiving an accelerator input; and
   providing a first substantially ramp-like increase in the second torque limit in the second torque during the acceleration time period using the one or more electric motors in response to receiving the accelerator input.

7. The method of claim 2, wherein limiting the first torque applied at the first wheel and limiting the second torque applied at the second wheel further comprises:
   providing a second substantially ramp-like increase in the first torque limit during the acceleration time period using the one or more electric motors in response to receiving an accelerator input; and
   providing a third substantially ramp-like increase in the second torque limit during the acceleration time period using the one or more electric motors in response to receiving the accelerator input, wherein a start time of the third substantially ramp-like increase occurs after a start time of the second substantially ramp-like increase.

8. The method of claim 1, wherein adjusting the operation of the electric steering system further comprises:
   providing a turning torque using the electric steering system in response to receiving an accelerator input, wherein the turning torque turns one or more wheels of the electric vehicle away from the first side of the electric vehicle.

9. The method of claim 8, wherein providing the turning torque further comprises:

providing the turning torque using the electric steering system, wherein a magnitude of the turning torque is determined based at least in part on a magnitude of the accelerator input.

10. The method of claim 1, further comprising:
adjusting a torque-speed curve of the one or more electric motors based at least in part on a reference torque-speed curve obtained from a reference vehicle having an internal combustion engine.

11. A system for controlling an electric vehicle, the system comprising:
one or more electric motors in mechanical communication with a first rear wheel on a first side of the electric vehicle and a second rear wheel on a second side of the electric vehicle;
an electric steering system in mechanical communication with one or more front wheels of the electric vehicle; and
a controller in electrical communication with the one or more electric motors and the electric steering system, wherein the controller is programmed to:
adjust an operation of the one or more electric motors of the electric vehicle to induce a loss of traction of the first rear wheel; and
adjust an operation of the electric steering system of the electric vehicle to induce a yaw motion of the electric vehicle, wherein a direction of the yaw motion is away from the first side of the electric vehicle.

12. The system of claim 11, wherein to adjust the operation of the one or more electric motors, the controller is further programmed to:
limit a first torque applied at the first rear wheel of the electric vehicle based on a first torque limit; and
limit a second torque applied at the second rear wheel of the electric vehicle based on a second torque limit, wherein the second torque limit is less than or equal to the first torque limit for a least a portion of an acceleration time period, and wherein the second torque limit increases during the acceleration time period.

13. The system of claim 12, further comprising an accelerator pedal position sensor in electrical communication with the controller, and wherein to limit the first torque applied at the first rear wheel and to limit the second torque applied at the rear second wheel, the controller is further programmed to:
provide a substantially step-like increase in the first torque limit during the acceleration time period using the one or more electric motors in response to receiving an accelerator input using the accelerator pedal position sensor; and
providing a first substantially ramp-like increase in the second torque limit in the second torque during the acceleration time period using the one or more electric motors in response to receiving the accelerator input using the accelerator pedal position sensor.

14. The system of claim 13, wherein to adjust the operation of the electric steering system, the controller is further programmed to:
provide a turning torque using the electric steering system in response to receiving the accelerator input using the accelerator pedal position sensor, wherein the turning torque turns the one or more front wheels of the electric vehicle away from the first side of the electric vehicle.

15. The system of claim 14, wherein to provide the turning torque, the controller is further programmed to:
provide the turning torque using the electric steering system, wherein a magnitude of the turning torque is determined based at least in part on a magnitude of the accelerator input.

16. The system of claim 15, wherein the controller is further programmed to:
adjust a torque-speed curve of the one or more electric motors based at least in part on a reference torque-speed curve obtained from a reference vehicle having an internal combustion engine.

17. The system of claim 16, further comprising a traction control system in electrical communication with the controller, wherein the controller is further programmed to:
increase a slip threshold of a traction control system of the electric vehicle for the first rear wheel during the acceleration time period.

18. A method for controlling an electric vehicle, the method comprising:
identifying a launch state of the electric vehicle;
adjusting an operation of one or more electric motors of the electric vehicle to induce a loss of traction of a first rear wheel of the electric vehicle on a first side of the electric vehicle during an acceleration time period in response to identifying the launch state;
adjusting an operation of an electric steering system of the electric vehicle to induce a yaw motion of the electric vehicle during the acceleration time period in response to identifying the launch state, wherein a direction of the yaw motion is away from the first side of the electric vehicle;
increasing a slip threshold of a traction control system of the electric vehicle for the first rear wheel during the acceleration time period; and
adjusting a torque-speed curve of the one or more electric motors during the acceleration time period based at least in part on a reference torque-speed curve obtained from a reference vehicle having an internal combustion engine.

19. The method of claim 18, wherein adjusting the operation of the one or more electric motors further comprises:
providing a second substantially ramp-like increase in a first torque limit applied to the first rear wheel during the acceleration time period using the one or more electric motors in response to receiving an accelerator input; and
providing a third substantially ramp-like increase in a second torque limit applied to a second rear wheel during the acceleration time period using the one or more electric motors in response to receiving the accelerator input, wherein a slope of the third substantially ramp-like increase is different from a slope of the second substantially ramp-like increase.

20. The method of claim 19, wherein adjusting the operation of the electric steering system further comprises:
providing a turning torque using the electric steering system in response to receiving an accelerator input, wherein the turning torque turns one or more wheels of the electric vehicle away from the first side of the electric vehicle, and wherein a magnitude of the turning torque is determined based at least in part on a magnitude of the accelerator input.

* * * * *